UNITED STATES PATENT OFFICE.

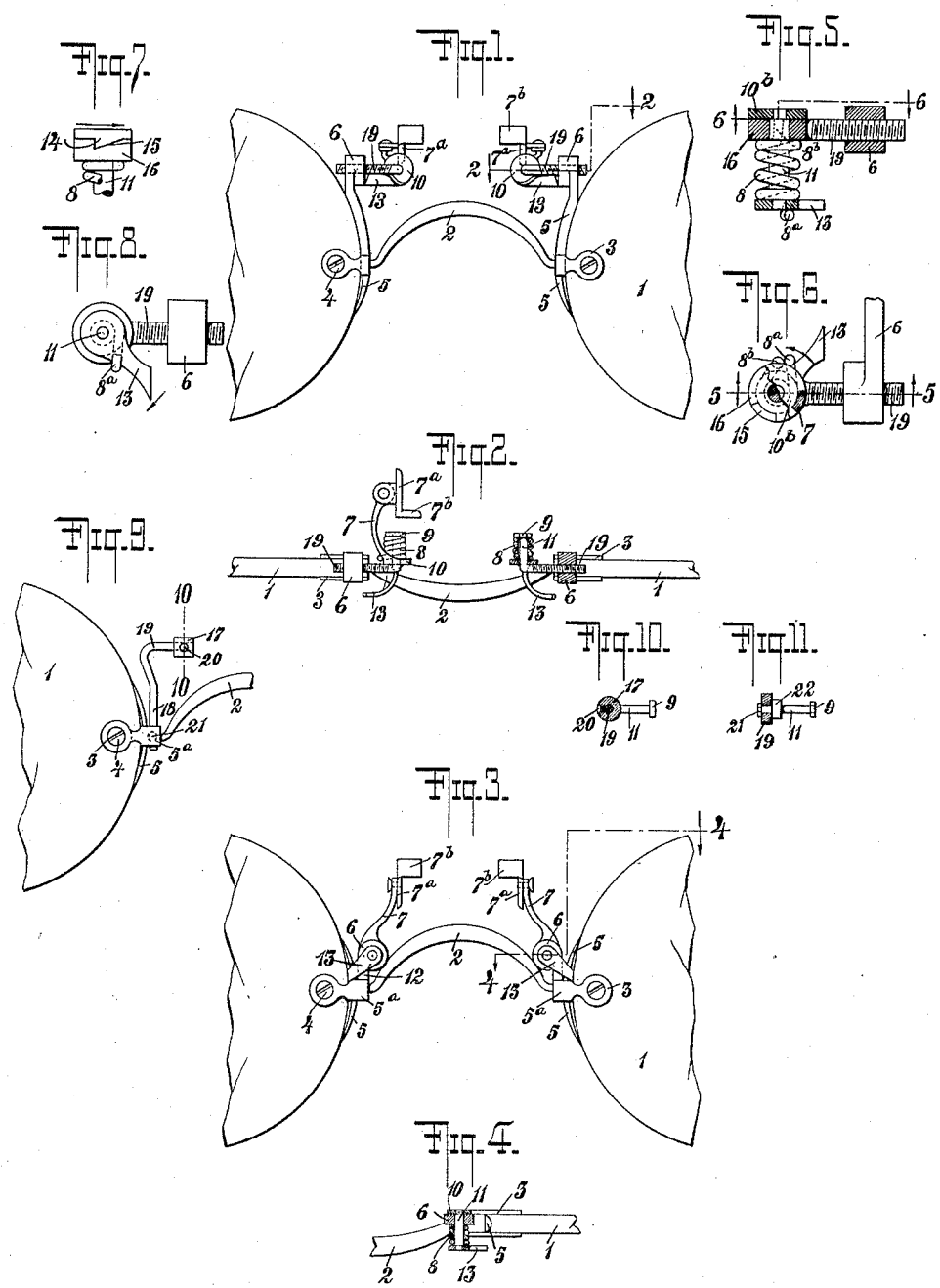

FRIEDRICH PELS-LEUSDEN, OF BERLIN, GERMANY.

RIGID-BRIDGE EYEGLASSES.

1,098,918.  Specification of Letters Patent.  Patented June 2, 1914.

Application filed October 29, 1912. Serial No. 728,381.

*To all whom it may concern:*

Be it known that I, FRIEDRICH PELS-LEUSDEN, a subject of the German Emperor, residing at Berlin, Germany, have invented certain new and useful Improvements in Rigid-Bridge Eyeglasses, of which the following is a specification.

My invention relates to eyeglasses provided with rigid bridges and to the particular class of such eyeglasses known as the finger piece variety.

More especially my invention herein set forth is an improvement in the type of eyeglasses shown and described in my pending application Serial No. 659,502, filed November 10, 1911, which eyeglasses are provided with an upper adjustable bridge carrying the finger pieces without, however, being limited to such type since the invention is applicable to all finger piece eyeglasses of whatever variety.

The object of my invention is to provide a special and novel arrangement of the finger pieces in which the turning or pivotal axis of each finger piece shall be perpendicular or approximately perpendicular to the plane of the lenses, instead of parallel thereto as in the usual construction, thereby securing certain peculiar advantages which will later be set forth.

A further object of my invention is to provide a special construction for attaching a turning axis as aforesaid to the frame of the eyeglasses and for adjusting the position of said axis to suit different individuals and varying conditions.

A further object of my invention is to provide a simpler and cheaper construction of the eyeglasses with upper bridge, above referred to as shown and described in my pending application Serial No. 659,502, by using therewith finger pieces having perpendicular axes and omitting the central portion of the upper bridge, the ends or sides of the upper bridge being extended centrally from each side only sufficiently far to permit the proper attachment and adjustment of the clamping devices.

Other objects and advantages of the invention will appear as the specification proceeds.

My invention will be better understood by referring to the accompanying drawings in which—

Figure 1 represents a front elevation, and Fig. 2 a plan (part section along 2—2 of Fig. 1), of a preferred form of my invention; Fig. 3 represents a front elevation and Fig. 4 a section along 4—4 of Fig. 3 of a modified form of my invention; Figs. 5, 6, 7 and 8 are enlarged detail views showing the relative arrangement of the turning axis, finger piece and clamping plates, spring which controls the finger piece structure, etc., in a modified form of my invention; Fig. 5 being a section along the line 5—5 of Fig. 6 (corresponding to the section along 2—2 of Fig. 1) Fig. 6 being an elevation of Fig. 5 (part section along 6—6 of Fig. 5), Fig. 7 a side elevation of Fig. 6, and Fig. 8 a front elevation of Fig. 5 showing the finger piece; Fig. 9 is an elevation showing another modification of my invention; Fig. 10 a transverse section along 10—10 of Fig. 9, and Fig. 11 a section, similar to that of Fig. 10, showing a slightly different construction in which flat metal instead of round wire is used for the upper bridge.

In the several views the outermost parts of the lenses are omitted in order to save space.

In the following detailed description corresponding parts of the several figures and modifications are similarly designated.

In the drawings, in all the modifications, the lenses 1 are connected by a rigid bridge 2, provided with ears 3, which embrace the lens and are fastened in position by screws 4; lobes 5, attached to the bridge or to parts joined thereto, bear against the edge of each lens for a greater or less distance above and below said ears. Other styles of frame and connecting structure may, however, be employed within the spirit of my invention.

In the form shown in Figs. 1 and 2 each upper lobe 5 is extended to a suitable height to constitute a supporting arm and terminates in a sleeve 6 which is threaded, horizontally and in or near the plane of the lenses, to receive an upper partial bridge arm 19 the inner end of which is bent at right angles and rearwardly to constitute a turning axis 11. Upon this axis is rotatably mounted a disk 10 provided with a downwardly, forwardly and laterally extending finger piece 13 and with a laterally and rearwardly extending clamp arm 7 terminating in a vertically or horizontally pivoted clamping plate 7ª. A coiled spring 8 having one end fastened to a notch or hole in a flange 9 fixed at the end of axis 11 and its other end suitably attached to the disk 10 or finger piece 13 is mounted upon the axis, keeps disks 10 pressed toward arm 19, and tends to press the one clamping plate 7ª inwardly toward the opposite plate 7ª. The arm 19 may be screwed in or out in the sleeve 6 and fixed at any desired point in order to adapt the eyeglasses to a particular individual. The finger piece 13 is preferably made rather small and positioned to lie substantially parallel to the arm 19 instead of angularly below said arm as it will thus be relatively inconspicuous.

In the modification shown in Figs. 3 and 4 the sleeve 6 is fixed at the top of a short supporting arm 12 the bottom of which is attached in any convenient way to a cross bar 5ª which unites the two ears 3 to one another and to the bridge. The turning axis 11 is rotatably mounted in this sleeve, substantially at right angles to the plane of the lenses, and to this axis is fixed at one end the finger piece 13 and to the other end the disk 10 carrying the clamp arm 7 and clamping plates 7ª. A spring 8 controls, as before, the rotary movement of the clamping system. It should be noted that, in Figs. 3 and 4, the turning axis projects forwardly from the lenses instead of rearwardly, as in Figs. 1 and 2.

In the modification shown in Fig. 9 the upper bridge arm 19 constitutes a suitably bent portion of a connecting stem or supporting arm 18 which has vertical adjustment in the cross bar 5ª. The turning axis 11 is fixed to a bushing 17 laterally slidable upon arm 19 and adapted to be fixed, when suitably adjusted, by a set screw 20. If the arm 19 be flattened instead of round as in Figs. 9 and 10, then a sufficient part of it may be horizontally slotted (Fig. 11) and the turning axis 11 be made to slide in this slot; a nut 21 may be used to draw a flange 22 fixed upon axis 11 against the arm and thus fix the axis in its final position.

Figs. 5 to 8 show, in enlarged detail, a preferred construction of the combined turning axis and clamping structure as it may be applied to any of the described types of upper bridge arm. As illustrated, turning axis 11 projects forwardly from the plane of the lenses, being held rotatably in a collar 16 fixed to the bridge arm 19. On the rear side of this collar (toward the eye) a disk 10ᵇ is fixed upon the end of the turning axis while the other end of said axis carries the finger piece 13. The spring 8, the convolutions of which are spaced apart, is mounted upon axis 11 between collar 16 and finger piece 13, one end, 8ᵇ, of said spring engaging a notch of said collar or being otherwise suitably attached and the other end being hooked over the edge of the finger piece. The disk 10ᵇ is provided with a tooth or projection 14 which, when the clamping plates are in their innermost position (Fig. 6), rests in a corresponding notch 15 cut in the collar 16.

The operation of my invention is as follows: Any of the various forms of eyeglasses described may be placed upon the nose by grasping the two finger pieces 13 between thumb and finger and placing the glasses in position with bridge against the nose and clamping plates suitably pushed back upon the sides of the nose; the finger pieces are then released. As the clamping plates close upon the flesh of the nose, the eyeglasses tend to be lifted slightly so that the portions of the nose under the bridge will carry less of the weight of the glasses, which loss of weight will be transferred to the two contact surfaces beneath the clamping plates. In the forms shown except Figs. 3 and 4 the turning axis may be shifted laterally so that the clamping plates will close at the best points for the particular individual being fitted; in the forms shown in Figs. 9 to 11 the axis may be similarly shifted vertically. If the arrangement of turning axis and clamping structure shown in Figs. 5 to 8 be employed then, when the finger pieces are pressed together (direction of arrows), preliminary to placing the glasses upon the nose, the disk 8ᵇ will be moved away from collar 16 owing to the rise of tooth 15 upon the angularly arranged side of its coöperating notch; this will cause the turning axis 11 to slide rearwardly with reference to the lenses in the collar 16 compressing spring 8. The clamping plates will thus also move rearwardly and away from the lenses. When, now, the finger pieces are released and the clamping plates permitted to close the lenses will be moved toward the face and the bridge 2 drawn firmly against the nose. The pressure with which the bridge is thus pressed upon the nose is dependent upon the angle or steepness of the incline of tooth 14 and its corresponding notch and the steeper this incline the greater the pressure. In practice I prefer to give the two contact surfaces of disk 10ᵇ and collar 16, a screw like formation and to make the inclination greatest at the extreme end of the notch.

Many changes in detail may be made from the forms shown in the accompanying drawings without departing from the scope of my invention as set forth in the following claims:

I claim—

1. Eyeglasses comprising in combination a pair of lenses connected by a rigid bridge, movable and resiliently controlled clamping devices adapted to grip the nose, turning axes for said clamping devices approximately perpendicular to the plane of the lenses, and horizontally disposed inwardly extended upper partial bridges supporting said turning axes at their inner ends.

2. Eyeglasses comprising in combination a pair of lenses connected by a rigid bridge, clamping devices adapted to grip the nose, said devices being movable about an axis approximately perpendicular to the plane of the lenses said devices being further provided with finger pieces the finger pieces lying below said axes and the clamping devices above, said devices being further arranged to normally press inwardly and downwardly.

3. Eyeglasses comprising in combination a pair of lenses connected by a rigid bridge, a pair of members each movable about an axis approximately perpendicular to the plane of the lenses and each comprising a finger piece formed thereon upon one side of the axis and a clamping part upon the other side of said axis, the finger pieces lying below said axes and the clamping parts above, said devices being further arranged to normally press inwardly and downwardly.

4. Eyeglasses comprising in combination a pair of lenses connected by a rigid bridge, turning axes substantially perpendicular to the plane of the lenses and adjustably attached to the frames, and a clamping device movable upon each of said axes and lying above the same each clamping device being further arranged to normally press inwardly and downwardly.

5. In an eyeglass, a finger piece arranged to rotate upon an axis approximately perpendicular to the plane of the lenses and provided with a disk, a support for said finger piece, and means for resiliently pressing said disk against said support and said disk being provided with a mutually engaging tooth and notch.

6. In an eyeglass, a finger piece provided with a disk, an axis of rotation for said finger piece approximately perpendicular to the plane of the lenses, a support for said axis, and a spring controlling said finger piece and pressing said disk axially against said support, said disk and said support being provided with a mutually engaging tooth and notch.

7. Eyeglasses comprising in combination a pair of lenses connected by a rigid bridge, clamping devices each comprising a clamping plate and a finger piece, an axis for each clamping device substantially perpendicular to the plane of the lenses, means for supporting each axis and for adjusting its position with reference to the lenses, and springs for the clamping devices pressing them inwardly and downwardly.

In witness whereof I have hereunto set my hand in the presence of two subscribing witnesses.

FRIEDRICH PELS-LEUSDEN.

Witnesses:
HENRY HASPER,
WOLDEMAR HAUPT.

---

Copies of this patent may be obtained for five cents each, by addressing the "Commissioner of Patents, Washington, D. C."